United States Patent
Cheng

(10) Patent No.: US 9,754,299 B2
(45) Date of Patent: Sep. 5, 2017

(54) SYSTEM, METHOD AND APPARATUS FOR THREE-DIMENSIONAL DIGITAL DESIGN CONTENT RIGHTS MANAGEMENT

(71) Applicant: Lee C. Cheng, Villa Park, CA (US)

(72) Inventor: Lee C. Cheng, Villa Park, CA (US)

(*) Notice: Subject to any disclaimer, the term of this patent is extended or adjusted under 35 U.S.C. 154(b) by 432 days.

(21) Appl. No.: 14/151,428

(22) Filed: Jan. 9, 2014

(65) Prior Publication Data

US 2014/0200697 A1 Jul. 17, 2014

Related U.S. Application Data

(60) Provisional application No. 61/751,551, filed on Jan. 11, 2013.

(51) Int. Cl.
*G06Q 30/06* (2012.01)
*G06F 17/50* (2006.01)
*G06F 21/10* (2013.01)

(52) U.S. Cl.
CPC ......... *G06Q 30/06* (2013.01); *G06F 2217/04* (2013.01)

(58) Field of Classification Search
None
See application file for complete search history.

(56) References Cited

U.S. PATENT DOCUMENTS

| 9,386,075 B2* | 7/2016 | Adriazola | G06F 8/61 |
| 2007/0174204 A1* | 7/2007 | Pae | G06Q 30/06 |
| | | | 705/59 |
| 2010/0169185 A1* | 7/2010 | Cottingham | G06F 17/50 |
| | | | 705/26.1 |
| 2011/0010265 A1* | 1/2011 | Hendricks | G06Q 30/06 |
| | | | 705/26.5 |
| 2011/0276502 A1* | 11/2011 | Dameri | G06Q 30/06 |
| | | | 705/317 |
| 2011/0313878 A1* | 12/2011 | Norman | G06Q 30/06 |
| | | | 705/26.5 |
| 2012/0102329 A1* | 4/2012 | Mittal | G06F 21/10 |
| | | | 713/176 |

(Continued)

FOREIGN PATENT DOCUMENTS

KR 20070061287 A * 6/2007 ........... G06Q 20/206

*Primary Examiner* — Farid Homayounmehr
*Assistant Examiner* — Thanh T Le
(74) *Attorney, Agent, or Firm* — The Webb Law Firm

(57) ABSTRACT

The present invention comprises a system and method for providing three-dimensional and maintaining digital design rights management. The invention comprises a first server computer configured to transmit, to user terminals, images associated with three-dimensional designs. The server receives at least one request, from at least one user terminal, to fabricate one or more three-dimensional objects from three-dimensional designs. A second server computer in communication with the first server computer, and located remotely from the first server computer is controlled by an entity that does not control the at least one first server computer. The second server computer is configured to store design specifications associated with three-dimensional designs and control a fabricating device in communication with the at least one second server computer. The fabricating device configured to fabricate at least one three-dimensional object based at least partially on at least one design specification without storing the design specifications.

16 Claims, 2 Drawing Sheets

(56) References Cited

U.S. PATENT DOCUMENTS

| 2013/0076898 A1* | 3/2013 | Philippe | H04N 7/18 348/143 |
| 2014/0156053 A1* | 6/2014 | Mahdavi | B29C 67/0059 700/119 |
| 2014/0214684 A1* | 7/2014 | Pell | G06Q 30/02 705/57 |

* cited by examiner

SYSTEM, METHOD AND APPARATUS FOR THREE-DIMENSIONAL DIGITAL DESIGN CONTENT RIGHTS MANAGEMENT

BACKGROUND OF THE INVENTION

Field of the Invention

The recent advancements in 3-D printing technology, in combination with the substantial reduction in cost of acquiring the technology, have provided consumers with increased access to the ability to fabricate and/or manufacture products right in their own homes. However, because of the ease at which digital information may be copied and reproduced, any digital designs or instructions sent to the consumer's location for fabrication may be easily captured and stored for later use by the consumer without further authorization of the company that provided the digital designs or instructions. Moreover, such digital designs or instructions may even be distributed freely across the Internet for download by anyone and, consequently, fabricated or manufactured for only the cost of the raw materials and the fabrication systems.

Description of Related Art

The drawbacks to the dissemination of fabrication design data pose concerns to those companies seeking to offset their manufacturing costs and/or deliver products to the consumer without physically manufacturing them, by providing digital designs and instructions directly to the consumers for desktop fabrication. Accordingly, an improved system and method is needed to ensure that any digital designs or instructions provided to the consumer may be accessed in accordance with the desires and limitations of the company providing those digital designs or instructions.

SUMMARY OF THE INVENTION

The present disclosure relates to a system and method for providing three-dimensional digital design rights management comprising: at least one first server computer configured to: transmit, to one or a plurality of user terminals, one or a plurality of images associated with one or a plurality of three-dimensional designs; and receive at least one request, from at least one user terminal, to fabricate one or more three-dimensional designs from the one or a plurality of three-dimensional designs; at least one second server computer in communication with the at least one first server computer, the at least one second server computer located remotely from the at least one first server computer and controlled by an entity that does not control the at least one first server computer, the at least one second server computer configured to store design specifications associated with the one or a plurality of three-dimensional designs; and a fabricating device in communication with the at least one second server computer, the fabricating device configured to fabricate at least one three-dimensional object based at least partially on at least one design specification without storing the design specifications.

The second server computer is located remotely from the at least one first server computer and is controlled by an entity that does not control the at least one first server computer. Only, the second server computer is configured to store design specifications associated with the one or a plurality of three-dimensional designs.

In some non-limiting embodiments, the fabricating device is further configured to store at least one identifier associated with the at least one design specification or the at least one three-dimensional object. In another example, the fabricating device may be further configured to provide the at least one identifier to a third-party. In another non-limiting embodiment, the fabricating device may not have any memory capable of storing design specifications. Additionally, the fabricating device may be further configured to create, on the at least one three-dimensional object, a unique identifier. The device may also be further configured to delete design specifications from at least one memory device after fabricating the at least one three-dimensional object.

In one non-limiting embodiment, a fabrication system includes: at least one computer-readable medium; means for fabricating three-dimensional objects; and at least one fabrication controller in communication with the at least one computer-readable medium and the fabrication means, the at least one fabrication controller configured to: receive design specifications and fabrication data from at least one server computer; fabricate at least one three-dimensional object with the fabrication means based at least partially on the design specifications; store an audit database comprising at least a portion of the fabrication data to the at least one computer-readable memory; and provide at least a portion of the audit database to at least one remote computer.

In some non-limiting embodiments, the fabrication data comprises a unique identifier for each fabrication specification. Additionally, the fabrication controller may erase at least a portion of the design specifications. Further, the at least a portion of the design specifications may be erased in response to a request from at least one remote computer. In one example, the fabrication controller may be further configured to create, on the at least one three-dimensional object, a unique identifier.

In another non-limiting embodiment, a computer-implemented method for managing rights to design specifications for a three-dimensional printer comprises the steps of: transmitting, to at least one client computer, data configured to display one or a plurality of images representing one or a plurality of three-dimensional objects; receiving, from the at least one client computer, a selection of at least one three-dimensional object of the one or a plurality of three-dimensional objects; transmitting a request to fabricate the at least one three-dimensional object to at least one content providing system, the request configured to cause the at least one content providing system to transmit design specifications for the at least one three-dimensional object to a three-dimensional printer, wherein the three-dimensional printer is remote from the at least one content providing system.

In some embodiments, at least one of the request and the design specifications may be configured to at least partially cause the three-dimensional printer to create a physical model of the three-dimensional object. Further, the three-dimensional printer may be further caused to imprint a unique identifier on the physical model of a three-dimensional object. Further, the three-dimensional printer may be further caused to erase at least a portion of the design specifications from at least one memory device. Additionally, in some examples, the three-dimensional printer may be further caused to store identifying data associated with the three-dimensional object. In some embodiments, the method further comprises receiving, from the three-dimensional printer, an audit of stored identifying data. The method may include the step of receiving, from the at least one client computer, a request to purchase the at least one three-dimensional object.

DETAILED DESCRIPTION OF THE INVENTION

Figure 1:
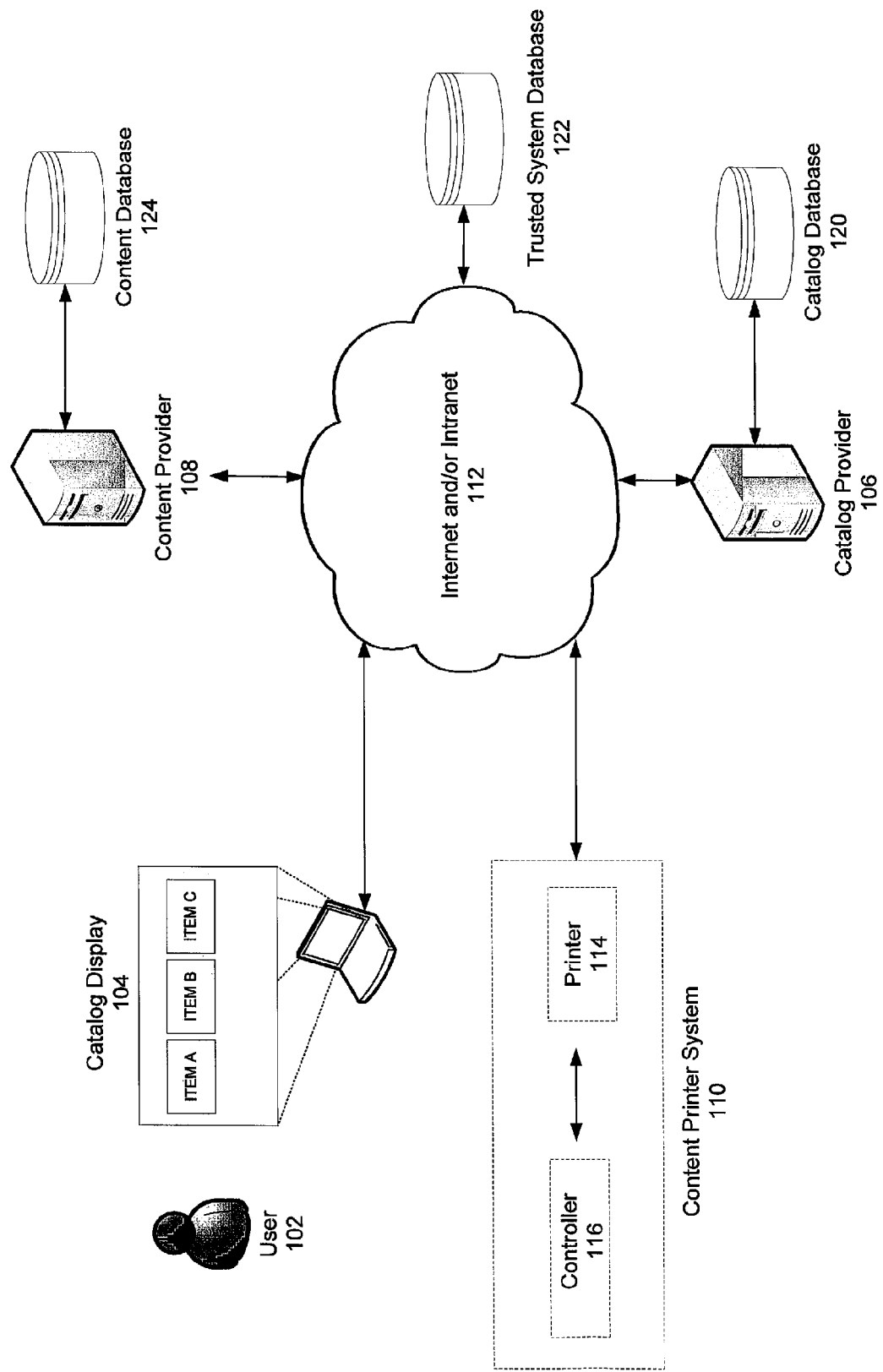
FIG. 1 illustrates an exemplary embodiment of the system and method for enhancing protection of content owner rights.

Numerous specific details are set forth to provide a thorough understanding of the embodiments. It will be understood by those skilled in the art, however, that the embodiments may be practiced without these specific details. In other instances, well-known operations, components, and/or circuits have not been described in detail so as not to obscure the embodiments. It can be appreciated that the specific structural and functional details disclosed herein may be representative and do not necessarily limit the scope of the embodiments. It is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Unless otherwise indicated, references throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

As used herein, the terms "communication" and "communicate" refer to the receipt or transfer of one or more signals, messages, commands, or other type of data. For one unit or device to be in communication with another unit or device, means that the one unit or device is able to receive data from and/or transmit data to the other unit or device. A communication may use a direct or indirect connection, and may be wired and/or wireless in nature. Additionally, two units or devices may be in communication with each other even though the data transmitted may be modified, processed, routed, etc., between the first and second unit or device. For example, a first unit may be in communication with a second unit even though the first unit passively receives data, and does not actively transmit data to the second unit. As another example, a first unit may be in communication with a second unit if an intermediary unit processes data from one unit and transmits processed data to the second unit. It will be appreciated that numerous other arrangements are possible.

Unless otherwise indicated, references throughout the specification to "network data" mean information that is encoded and organized in a computer readable format and transmitted between one or more resources or devices via one or more networks.

FIG. 1 illustrates an exemplary non-limiting embodiment of a three-dimensional digital design rights management system 100. A three-dimensional printer or Content Printing System ("CPS") 110 is in communication with a content provider 108 and/or catalog provider 106 via the Internet and/or Intranet 112. The content provider 108 and the catalog provider 106, controlled by separate entities, and provide different services. Therefore, the catalog provider does not store the content, i.e. design specifications or any other documents that can provide fabrication instructions. A CPS may include, for example, a three-dimensional printer or other like fabrication device or means for fabricating a three-dimensional object. Additionally, the exemplary embodiment of FIG. 1 also illustrates an interface, or catalog display 104 in communication with a network environment 112, such as, but not limited to the Internet, to the catalog provider 106 in order for a user 102 to place a request to fabricate one or more designs illustrated in the catalog display 104 by the CPS 110.

In one embodiment, the catalog display 104 is a website interface including webpages, images, and corresponding descriptions for one or a plurality of three-dimensional designs. However, it will be appreciated that the catalog display 104 may take on any other number of forms. In one example, the catalog display 104 may be configured to allow search, selection, and purchase of a three-dimensional design.

The web server or catalog provider 106, in the non-limiting exemplary embodiment of FIG. 1, may be in communication with one or more catalog databases programmed and/or configured to store product data in order to provide user 102 with a list of products that may be purchased for manufacturing by a CPS 110 under the possession and/or control of the user 102 or to any other CPS specified by the user 102. It will be appreciated that product data may include, but is not limited to, product identifier data, product name data, product description data, product specification data, product image data, product model data, product material data, or any other data that describes the product. The product data may also include a unique identifier for each fabrication request.

In one preferred and non-limiting embodiment, the catalog provider 106 is hosted, provided, and/or controlled by a different entity or party than the content provider 108. For example, the content provider 108 may also be the content owner, or an entity that the content owner designates as the content provider 108. In this way, the content provider 108 may be different for all or some of the content owners, or may be a central server that is designated by various content owners. In one embodiment, the content provider 108 may not have any control over the catalog provider 106 and/or the CPS 110. In this embodiment, the content provider 108 is one or more server computers that are owned or controlled by entities that have no ownership or control over the catalog provider 106 and/or the CPS 110, and merely make content selectively available to the catalog provider 106 and/or the CPS 110 under appropriate conditions. However, it will be appreciated that numerous control and/or ownership arrangements are possible between the content provider 108, the catalog provider 106, and the CPS 110.

Additionally, in some implementations of the non-limiting exemplary embodiment of FIG. 1, each catalog database may be associated with one or more content providers 108, such that each catalog database contains product data that describes the product designs or instructions stored in a content database. Furthermore, the catalog database may be programmed and/or configured to store the product data.

It will be appreciated that the specifications may be compiled or translated to an intermediate data type derived from Computer Aided Design software and/or Computer Aided Manufacturing Software. The design specifications may be programmed and/or configured to be readable or interpretable by the CPS 110 and when further executed or interpreted by the CPS 110, causes the CPS 110 to print or manufacture the product embodied in the design specifications. Further, it will be appreciated that design specifications may include, but are not limited to, coordinate data (e.g., x, y, and z coordinates), material data (e.g., material type), temperature data (e.g., temperatures of material), and/or color data (e.g., colors and dyes). Additionally, it will be appreciated that the specifications may further include, but are not limited to, control statements similar to those commonly used in computer programming languages. The design specifications for a particular three-dimensional design may be stored in a three-dimensional design file or in any other form of data structure.

In some implementations, the catalog provider 106 may be programmed and/or configured to provide a catalog display 104 to the user 102. Moreover, the catalog display 104 may be programmed and/or configured to display Product data for purchase by a User 102 and subsequent fabrication on a CPS 110. In a non-limiting exemplary implementation, the catalog provider 106 may be programmed and/or configured to read or retrieve product data from the catalog database, and provide product data to the catalog display 104 for selection and/or purchase by a user 102. The catalog display 104 may be programmed and/or configured to receive the product data and display the product data to the user 102 so that the user 102 may make an informed decision before selecting a product for fabrication or manufacturing on a CPS 110. Additionally, the catalog display 104 may be programmed and/or configured to enable a user 102 to select a product for fabrication or manufacturing, and enable the user 102 to purchase the selected product for fabrication or manufacturing on a CPS 110 identified by the user 102.

Additionally, in some embodiments, the catalog provider 106 may be in communication with a Trusted System database. The database may be programmed and/or configured to contain a list of CPS 110 identified with a CPS Identifier. The catalog provider 106 may be programmed and/or configured to enable fabrication or manufacturing of products only with respect to CPS 110 identified by a CPS Identifier in the Trusted System database. This will ensure that any security comprised content protection system cannot be used to capture design specifications for subsequent unauthorized fabrication or manufacture of products.

Further, in some implementations of the non-limiting exemplary embodiment of FIG. 1, the catalog provider 106 may be in communication with the content provider 108 in order to request the content provider 108 to transmit or send design specifications associated with a product purchased and/or selected by the user 102 to a CPS 110. Thus, in these implementations, the catalog provider 106 may be programmed and/or configured to send or transmit at least product identifier data to the content provider 108. Additionally, depending on the implementation, the catalog provider 106 may be further programmed and/or configured to transmit the CPS Identifier to the content provider 108, so that the content provider 108 may send or transmit the design specifications associated with the Product Identifier Data to the CPS 110 identified by the CPS Identifier.

In some implementations, the catalog display 104 may be implemented in a web browser and the catalog provider 106 may be implemented as a web server. In other implementations, the catalog display 104 may be implemented as a computer executable and/or interpretable module (as a separate module from the web browser and/or embedded in the web browser) and may be programmed and/or configured to display the product data, including product model data, rendered as a three-dimensional object that is representative of a product that may be fabricated or manufactured. Two-dimensional images and/or renderings may also be displayed in combination with or instead of the three-dimensional renderings. Additionally, the catalog display 104 may be further programmed and/or configured to enable the manipulation of a view point by the user 102 of the three-dimensional object on the display, so that a user 102 may preview the three-dimensional object representative of a product that may be fabricated or manufactured.

The content provider 108, in the non-limiting exemplary embodiment of FIG. 1, may be in communication with the content database and the Trusted Fabrication System database. The content database may be programmed and/or configured to store product designs or instructions as design specifications.

Figure 2:
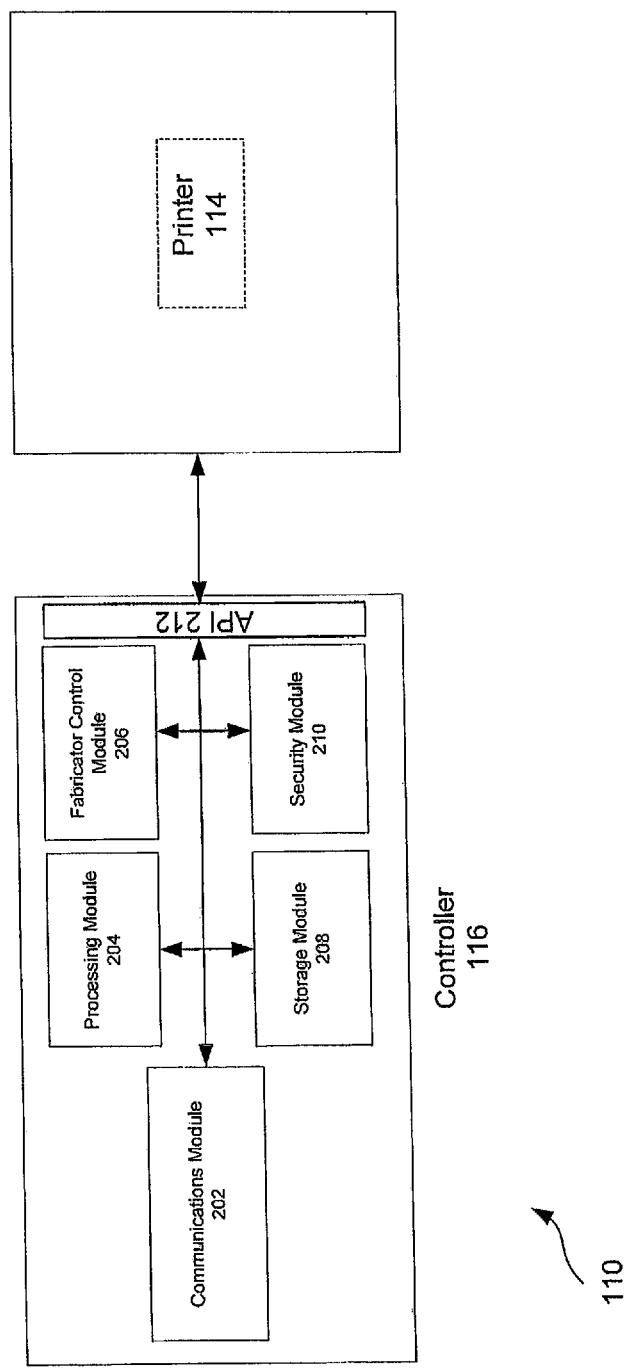
FIG. 2 illustrates an exemplary embodiment of the Content Protected Fabrication System.

Referring now to FIG. 2, a further view of a CPS 110 is shown according to one non-limiting embodiment. The CPS 110 includes a three-dimensional printer 114, and a controller 116. The controller 116 may include a number of modules including, for example, a communications module 202, a processing module 204, a control module 206, a storage module 208, and a security module 210. An Application Programming Interface (API), or other like interfaces, may serve to communicate with the printer 114 and/or entities such as the catalog provider 106 and/or the content provider 108.

With continued reference to FIG. 2, in one embodiment, certain data may be retained by the CPS 110 by the storage module 208 such as, but not limited to, unique identifiers for each fabrication request, a list of previous fabrication requests, and/or the like. This data may then be accessed by or provided to outside parties, such as, but not limited, to the content provider 108 or an interested third-party, such as an original creator or seller of the three-dimensional design and/or the like. In this manner, outside parties may effectively audit the CPS 110. Users auditing the CPS 110 may have to supply credentials to the CPS 110 prior to auditing.

Still referring to FIG. 2, the control module 206 may be programmed and/or configured to determine the authenticity of content, and/or perform any necessary decryption and/or encryption. In one example, the control module 206 may have a public key for decrypting digital content (e.g., design specifications) encrypted with a private key. The opposite may also be possible, using a private key to decrypt digital content encrypted with a public key. Other encryption schemes are possible, to encrypt and/or decrypt the content, and to encrypt and/or decrypt any data related to the content.

In one non-limiting embodiment, the CPS 110 may be configured to etch, engrave, imprint, or otherwise create, on a piece of material being fabricated into a physical model of a three-dimensional object, a unique identifier. The unique identifier may be unique to the content provider, may be unique to the individual, may be unique to the user purchasing the object, and/or may be unique to a specific type of content or third-party content creator. In one example, the unique identifier may be text, characters, a barcode, a design, and/or any other type of identifier.

In some non-limiting embodiments, the security module in conjunction with the processing module may be configured to provide the ability to attest the running processes and operating system integrity on the CPS 110. The security module may also have a read only CPS Identifier associated with the CPS 110. Thus, the Security module in conjunction with the processing module may be able to ensure that all the running processes are only the authorized processes. Any deviation may cause the CPS 110 to send its CPS Identifier to a content provider for black listing, i.e., removal from the Trusted System database. Such removal could prevent the CPS 110 from being able to fabricate or manufacture, because no content provider would send any design data to it.

The processing module in conjunction with the communications module may be configured to receive design data received either from the catalog provider (indirectly in some examples) or the content provider (directly in some examples). The processing module in conjunction the security module may should be able verify the integrity of design data and decrypt it into memory, i.e., the storage module for further processing (execution, interpretation or translation) by the control module to control the printer via API. The control module may be configured to execute, translate, interpret the design data and print, fabricate, or manufacture the product based on the design data using the API. After the process is complete, the processing module in conjunction with the security module may perform a memory wipe using a three pass algorithm, as an example, on selected number of memory blocks. It will also be appreciated that, in some embodiments, the CPS may not be provided with any memory capable of storing design specifications. The fabricator API may provide a high level interface that abstracts away the detailed algorithms necessary to control the motors and/or any additional embedded controllers within the device. The printer may contain motors, embedded code, controllers, injectors, resin heaters, drills, and/or the like that are governed by the software API and controlled by the fabricator control module.

The system can be implemented as a hardware element, a software element executed by a computer, a firmware element embedded in hardware, or any combination thereof. In various embodiments, the logic flow may comprise, or be implemented as, executable computer program instructions. The executable computer program instructions may be implemented by software, firmware, a module, an application, a program, a subroutine, an instruction set, computing code, words, values, symbols, or combination thereof. The executable computer program instructions may include any suitable type of code, such as source code, compiled code, interpreted code, executable code, static code, dynamic code, and the like. The executable computer program instructions may be implemented according to a predefined computer language, manner, or syntax, for instructing a computer to perform a certain function. The executable computer program instructions may be implemented using any suitable high-level, low-level, object-oriented, visual, compiled, and/or interpreted programming language in accordance with the described embodiments.

In various embodiments, a logic flow may comprise, or be implemented as, executable computer program instructions stored in an article of manufacture and/or computer-readable storage medium. The article and/or computer-readable storage medium may store executable computer program instructions that, when executed by a computer, cause the computer to perform methods and/or operations in accordance with the described embodiments. The article and/or computer-readable storage medium may be implemented by various systems and/or devices in accordance with the described embodiments. In such embodiments, a computer may include any suitable computer platform, device, system, or the like implemented using any suitable combination of hardware and/or software.

The article and/or computer-readable storage medium may comprise one or more types of computer-readable storage media capable of storing data, including volatile memory or, non-volatile memory, removable or non-removable memory, erasable or non-erasable memory, writeable or re-writeable memory, and so forth. Additionally, the article and/or computer-readable storage medium may be of the non-transitory type. Examples of computer-readable storage media may include, but are not limited to, random-access memory (RAM), dynamic RAM (DRAM), double-data-rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other suitable type of computer-readable storage media in accordance with the described embodiments.

While certain features of the embodiments have been illustrated as described above, many modifications, substitutions, changes, and equivalents will now occur to those skilled in the art. It is, therefore, to be understood that the appended claims are intended to cover all such modifications and changes as fall within the true spirit of the embodiments.

The invention claimed is:

1. A system for providing three-dimensional digital design rights management, comprising:

at least one first server computer configured to: transmit, to one or a plurality of user terminals, descriptive information associated with one or a plurality of three-dimensional design specifications stored on a second server and not stored on the first server; and receive at least one request, of at least one user terminal, to fabricate one or more three-dimensional designs from the one or a plurality of three-dimensional designs;

at least one second server computer in communication with the at least one first server computer, the at least one second server computer located remotely from the at least one first server computer and controlled by a different entity than an entity that controls the at least one first server computer, wherein the at least one second server computer is configured to store design specifications associated with the one or more three-dimensional designs; and a device in communication with the at least one second server computer, the device fabricates one or more three-dimensional objects based at least partly on one or more design specifications permanently stored at the second server computer, wherein the design specification is erased in response to a request from the second server computer, wherein on purchase of a design fabrication of a three-dimensional object by viewing descriptive information associated with the design specification stored separately on the first server prompting the first server to send a message to the second server causing the second server to transmit design specifications to the fabricating device, and wherein the message further includes a product ID and a device ID, the device ID identifying a fabricator.

2. The system of claim 1, wherein the device is further configured to store at least one identifier associated with the at least one three-dimensional design, wherein a product ID is received from the second server.

3. The system of claim 2, wherein the device is further configured to provide the at least one identifier to a third-party.

4. The system of claim 1, wherein the device is further configured to create, on the at least one three-dimensional object, a unique identifier.

5. A three-dimensional printing system comprising:
at least one non-transitory computer-readable medium;
a fabricating device;
at least one controller in communication with the at least one non-transitory computer-readable medium and the fabricating device, the at least one controller comprising circuitry configured to:
receive instructions from at least one server computer, interfacing with the three-dimensional printing system to control fabrication of a three-dimensional object;
by the fabricating device, fabricate one or more three-dimensional objects based at least partly on a design specification;
erase at least a portion of the design specifications;
store an audit database comprising at least a portion of the fabrication data; and
provide at least a portion of the audit database to at least one remote computer,
wherein on purchase of the three-dimensional object by viewing descriptive information associated with the design specification stored separately on the first server, prompting the first server to send a message to the second server causing the second server to transmit design specifications to the fabricating device, and wherein the message further includes a product ID and a device ID, the device ID identifying a fabricator.

6. The fabrication system of claim 5, wherein the fabrication data comprises a unique identifier for each design specification.

7. The fabrication system of claim 5, wherein the at least a portion of the design specifications is erased in response to a request from at least one remote computer.

8. The fabrication system of claim 5, wherein the controller is further configured to create, on the one or more three-dimensional objects, a unique identifier.

9. The fabrication system of claim 5, further comprising:
a security module with a read only memory storing an identifier associated with the device ID, the security module capable of ensuring that the running processes are only the authorized processes.

10. The fabrication system of claim 9, wherein the security module can detect a deviation, causing transmission of its identifier to a content provider for black listing from a trusted system database, wherein the system is prevented from fabricating.

11. A computer-implemented method for managing rights to design specifications for three-dimensional printers, the method comprising:
transmitting, to at least one client computer, data configured to display descriptive information associated with one or a plurality of three-dimensional objects and having design specifications stored on a second server and not stored on a first server;
receiving, from the at least one client computer, a selection of at least one three-dimensional object of the one or a plurality of three-dimensional objects;
transmitting a request to fabricate on purchase of the at least one three-dimensional object to at least one content providing system, the request configured to cause the at least one content providing system to transmit design specifications for the at least one three-dimensional object to a three-dimensional printer, wherein the three-dimensional printer is remote from the at least one content providing system; and
erasing at least a portion of the design specifications from at least one memory device of the three-dimensional printer,
wherein on purchase of a design fabrication of a three-dimensional object by viewing descriptive information associated with the design specification stored separately on the first server prompting the first server to send a message to the second server causing the second server to transmit design specifications to the fabricating device, and wherein the message further includes a product ID and a device ID, the device ID identifying a fabricator.

12. The method of claim 11, wherein at least one of the request and the design specifications are configured to at least partially cause the three-dimensional printer to create a physical model of the three-dimensional object.

13. The method of claim 12, wherein the three-dimensional printer is further caused to imprint a unique identifier on the physical model of three-dimensional object.

14. The method of claim 12, wherein the three-dimensional printer is further caused to store identifying data associated with the three-dimensional object.

15. The method of claim 12, further comprising receiving, from the three-dimensional printer, an audit of stored identifying data.

16. The method of claim 12, further comprising receiving, from the at least one client computer, a request to purchase the at least one three-dimensional object.

* * * * *